Figure 1:
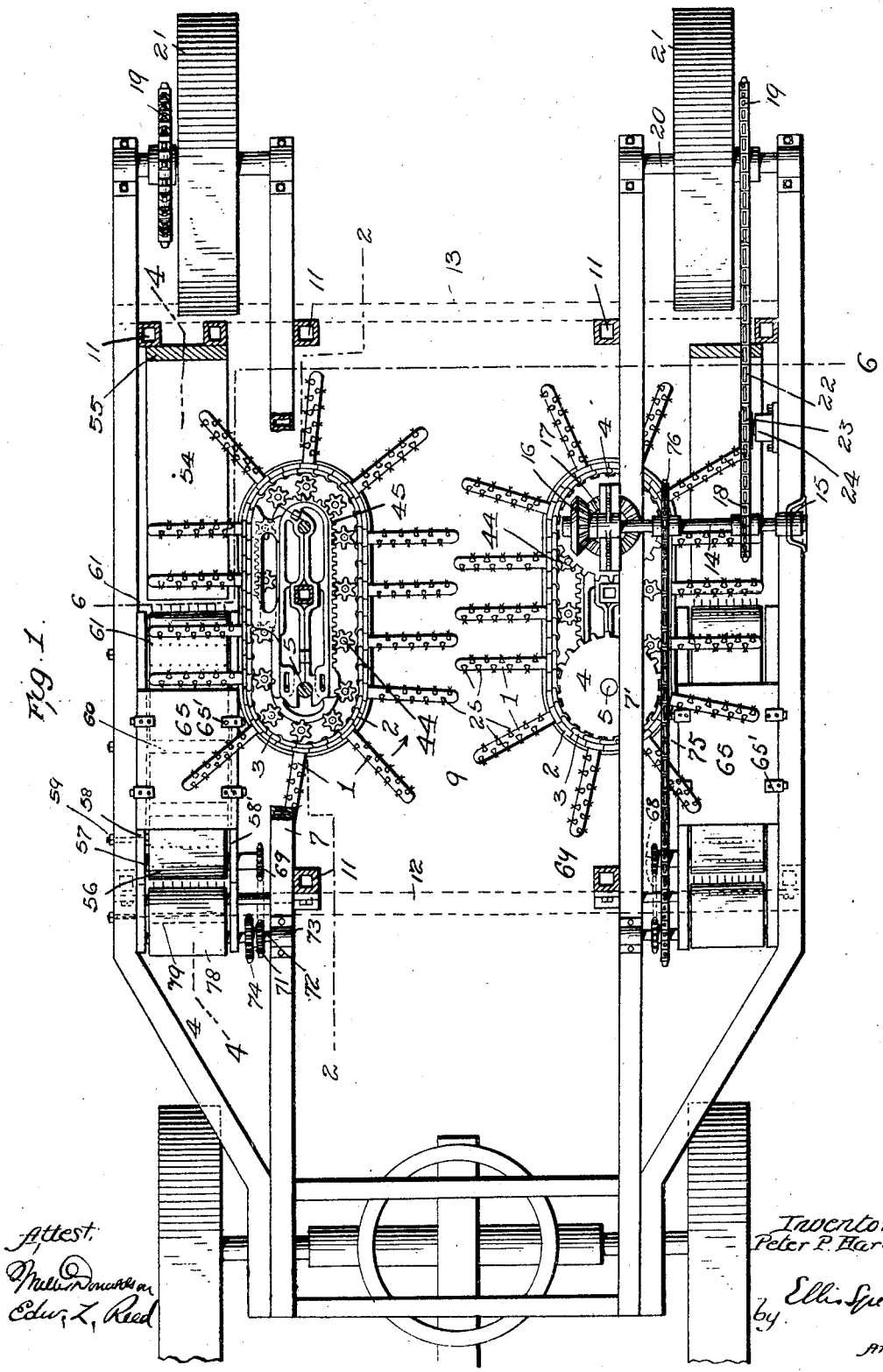

No. 796,421. PATENTED AUG. 8, 1905.
P. P. HARING.
COTTON PICKING MACHINE.
APPLICATION FILED AUG. 20, 1902.
5 SHEETS—SHEET 1.

Attest:
Inventor:
Peter P. Haring
by Ellis Spear
Atty.

No. 796,421. PATENTED AUG. 8, 1905.
P. P. HARING.
COTTON PICKING MACHINE.
APPLICATION FILED AUG. 20, 1902.
5 SHEETS—SHEET 2.
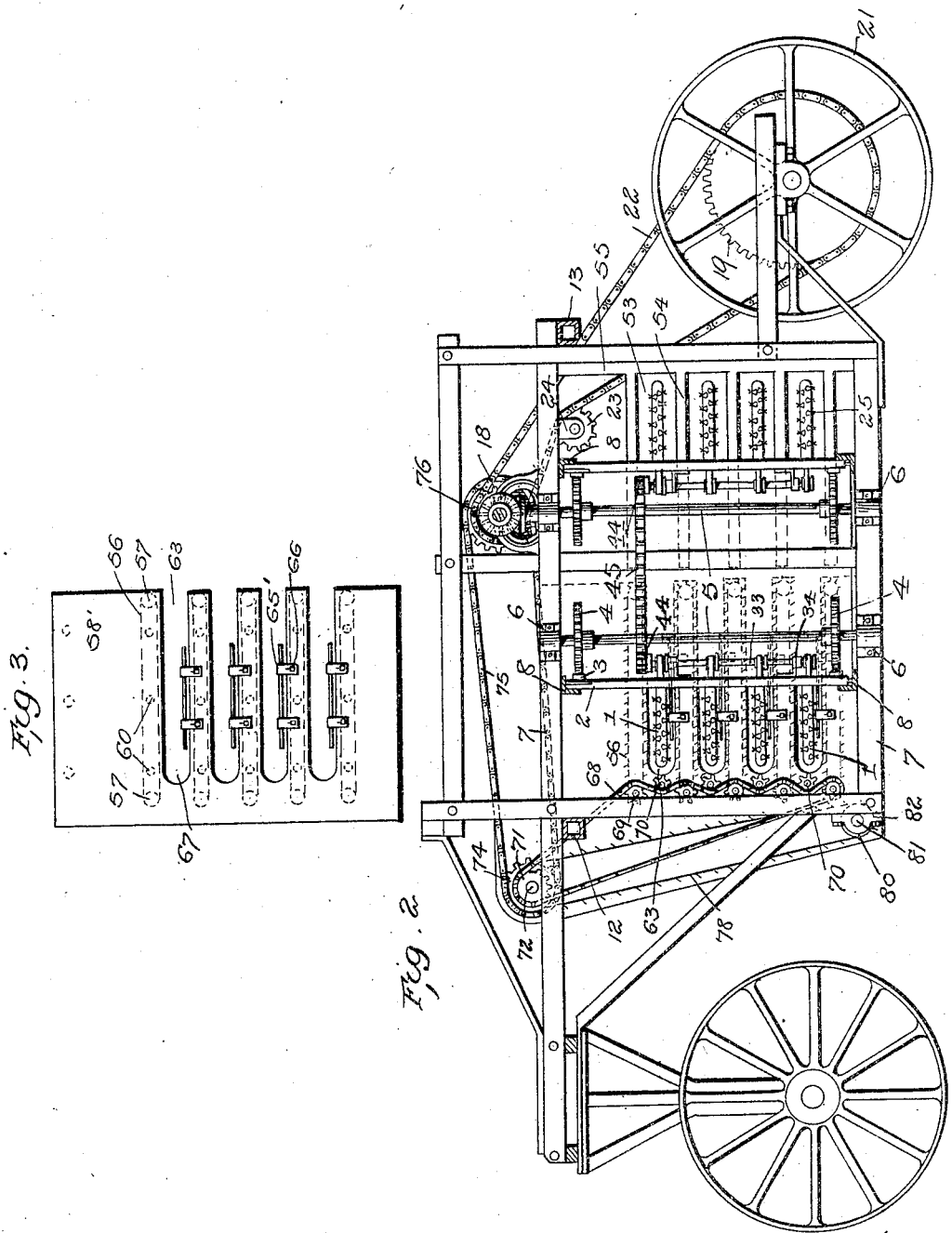
Attest:
Inventor.
Peter P. Haring.
by Ellis Spear
Atty.

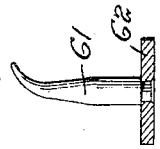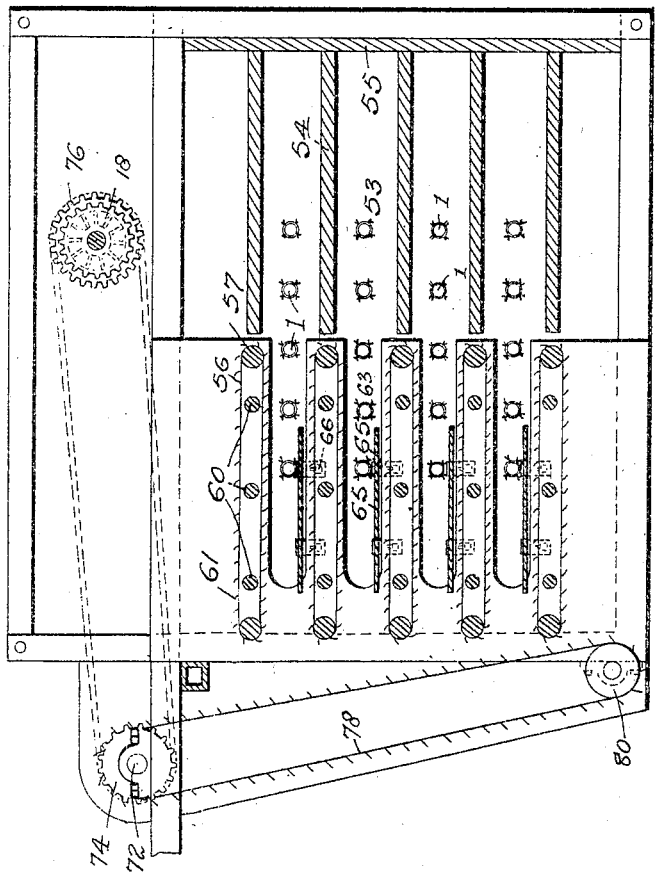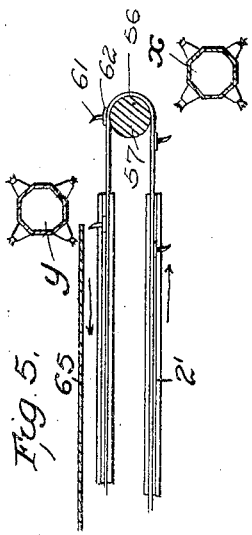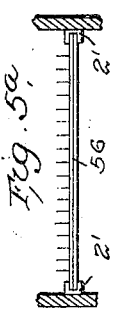

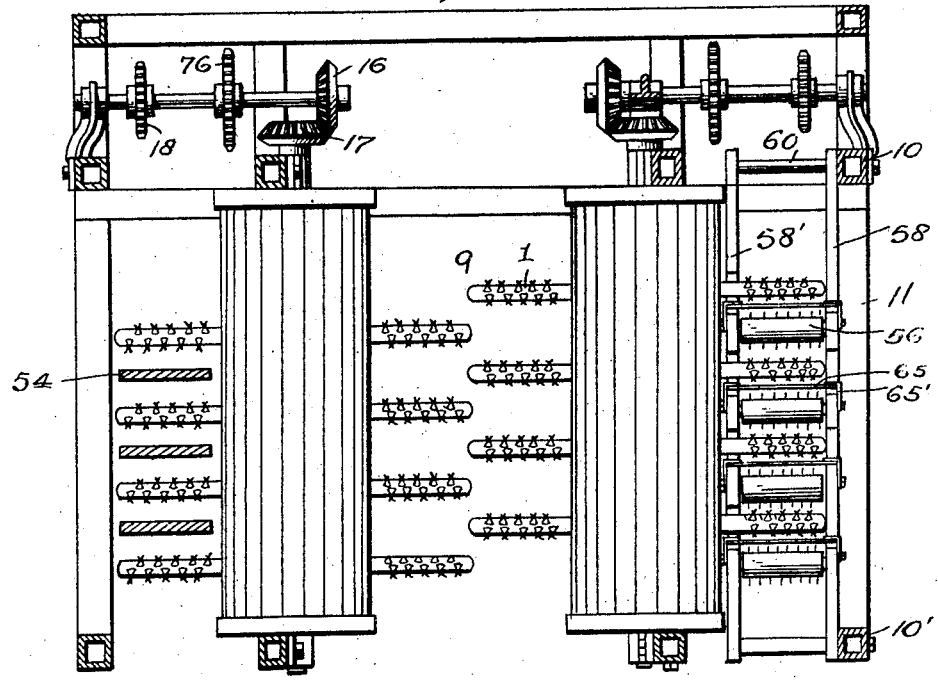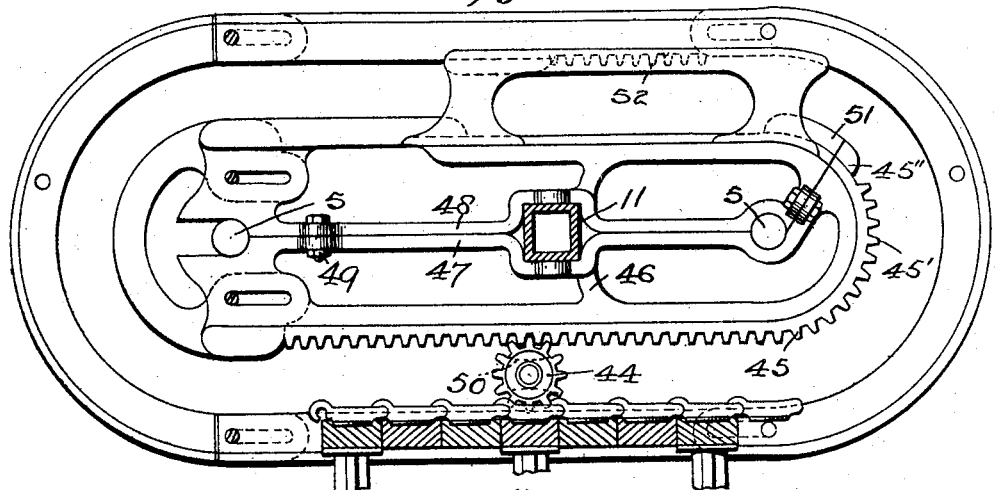

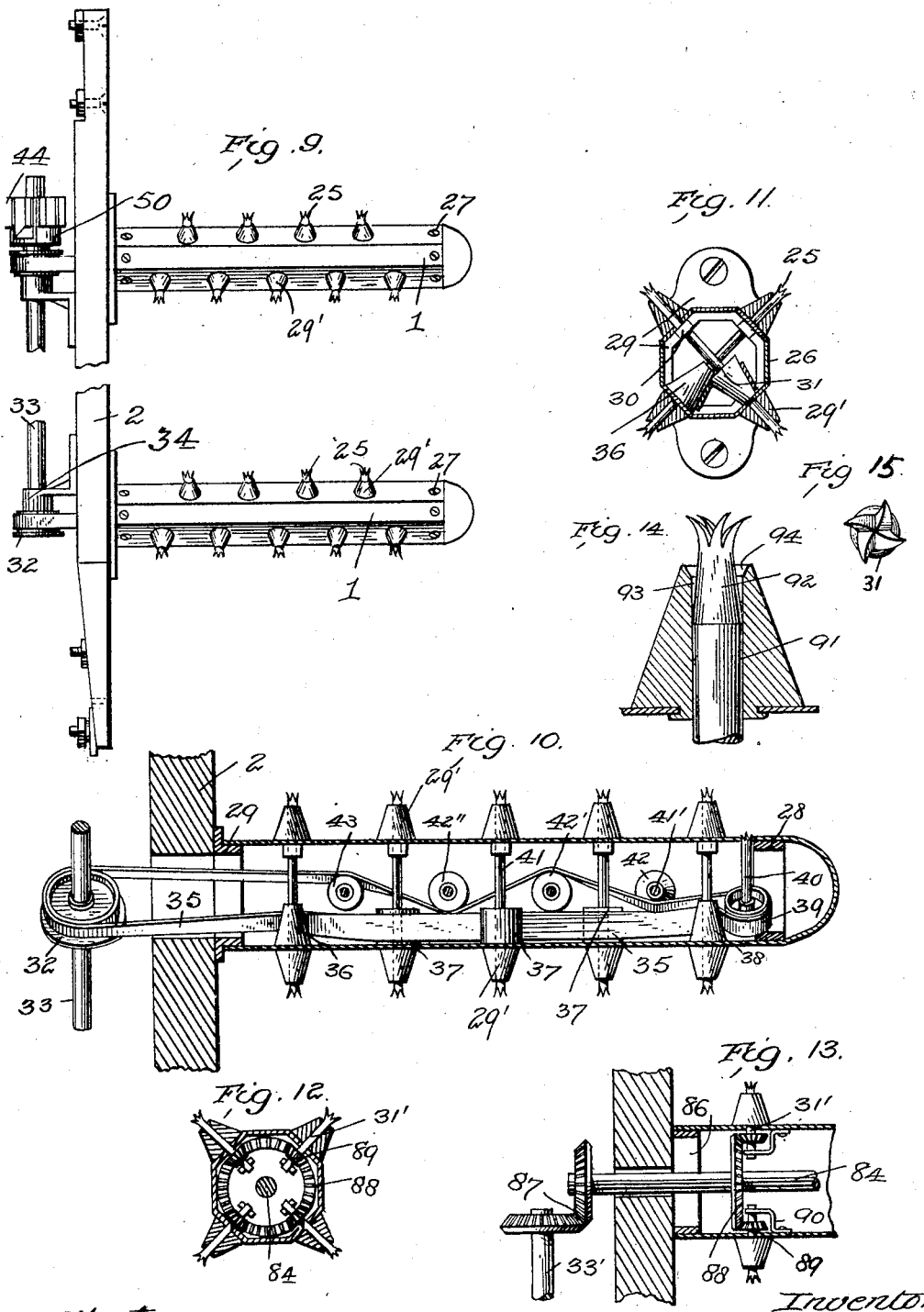

UNITED STATES PATENT OFFICE.

PETER PAUL HARING, OF GOLIAD, TEXAS.

COTTON-PICKING MACHINE.

No. 796,421.　　　　　Specification of Letters Patent.　　　　　Patented Aug. 8, 1905.

Application filed August 20, 1902. Serial No. 120,423.

*To all whom it may concern:*

Be it known that I, PETER PAUL HARING, a citizen of the United States, residing at Goliad, county of Goliad, and State of Texas, have invented certain new and useful Improvements in Cotton-Picking Machines, of which the following is a specification.

My invention is an improvement upon the cotton-picking machine disclosed in Letters Patent of the United States, granted to me July 27, 1897, No. 587,201.

In my present machine I provide means whereby a greater number of picker-spindles can be arranged around the circumference of the picker-arms than is employed in the arrangement shown in the said patent, and all of the said picker-spindles are arranged to be driven through a common driving connection extending longitudinally of the arms.

I have also provided in the present machine a new form of picker-finger, which will more readily take hold of the cotton, will retain the same thereon more securely, and will more readily free the same at the proper time when the finger is properly operated.

I have also provided means whereby the cotton is positively removed from the picker-fingers after the same have been operated to free the cotton.

My invention consists in the features and combination and arrangement of parts hereinafter described, and particularly pointed out in the claims.

In the drawings, Figure 1 is a plan view of the machine, with parts omitted and parts in section. Fig. 2 is a sectional view on line 2 2 of Fig. 1. Fig. 3 is a side view of a detail. Fig. 4 is a detail view of the means for stripping the cotton from the picker-arms, it being an approximate section on line 4 4 of Fig. 1. Fig. 5 is a detail view of the stripper means. Fig. 5$^a$ is a view of a detail. Fig. 6 is a sectional view from the rear of the machine approximately on line 6 6 of Fig. 1. Fig. 6$^a$ is a detail sectional view. Fig. 7 is a detail plan view of the gear-track for operating the picker-fingers and for reversing the rotary movement of said fingers for the release of the cotton. Fig. 8 is an edge view of Fig. 7. Fig. 9 is a detail view showing two of the picker-arms in side elevation and the means for carrying and driving them. Fig. 10 is a sectional view longitudinally of one of the arms. Fig. 11 is a transverse section of a picker-arm. Figs. 12 and 13 are views similar to Figs. 10 and 11 of a modified arrangement for driving the picker-spindles. Fig. 14 is an enlarged view of the picker-spindle and its bearing. Fig. 15 is a plan view of the picker shown in Fig. 14.

In the drawings the picker-arms 1 are shown as supported by vertically-arranged slats 2, each slat having a number of the arms arranged thereon one above the other. The slats are connected to upper and lower chains 3, which are engaged and driven by sprocket-wheels 4, fixed on shafts 5, arranged to turn in bearings 6, fixed to the frame-bars 7 7'. The upper and lower ends of the slats 2 are arranged to move in guideways 8, secured to the frame-bars. There are two of these slatted carriers for the picker-arms, as shown in Fig. 1, one on each side of the machine, and the picker-arms carried thereby project across the space 9, located between the two sides of the frame, each of which sides is made up of upper and lower longitudinally-extending bars 7 7', upper and lower longitudinal bars 10 10', and vertical bars 11, suitably bolted or connected together. The two side frames are connected by a cross-bar 12 at the front and a cross-bar 13 at the rear, and these bars extend only across the upper part of the framework, leaving the space 9 beneath the bars and between the two side frames of the machine free and unobstructed for the passage of the cotton-plants therethrough, excepting, of course, that the picker-arms 1, as before stated, as they come around extend transversely of this space, those on one side of the machine reaching about half-way across and being interspaced with those of the other side, whose ends likewise lie about midway of the space 9, this arrangement insuring that all parts of the plant will be engaged by the picker-arms.

One of the shafts 5 on each side of the machine is driven from a shaft 14, journaled in bearings 15, secured to the frame, and each shaft having a beveled gear 16 thereon, meshing with a similar gear on the shaft 5, by which the sprocket-chain 3 and the slatted carrier for the picker-arms is driven. Each shaft 14 is driven by a sprocket-wheel 18 thereon from a sprocket-wheel 19 on the shafts 20 of the rear carrying-wheels 21 of the machine, a sprocket-chain 22 being used on each side of the machine for the purpose and each chain passing over an idler-wheel 23, journaled in a suitable bracket 24, supported on the frame.

Each picker-arm carries a plurality of picker-fingers 25, disposed at different points along the arm. In my present improvement I have provided means whereby a larger number of picker-fingers may be employed on the arm, and instead of having them only on the upper and lower sides of the arm my present improvement renders it possible to have the picker-fingers extend in a greater number of radial directions. As shown in Figs. 9, 10, and 11, the picker-fingers are so disposed that they radiate in four different directions. The picker-arm is of octagonal cross-sectional shape and is made up of a series of plates 26, one for each side or face of the arm, said plates being screwed, as at 27, to end castings 28 29, the latter of which is secured to the vertical slat 2. Certain of these plates carry projecting cones 29′, secured thereto in any suitable manner—as, for instance, by having their stems pass through the plates and riveted thereto at 30, Fig. 11. Through these conical projections and diametrically across the picker-arm the spindles 31 of the picker-fingers extend. Each spindle, as shown in Fig. 11, is inclined at an angle of forty-five degrees, and at each end it has the picker-fingers thereon. I have provided special means whereby I am enabled to drive these spindles, notwithstanding they are located in different incline planes and radiate in different directions at right angles to each other. All of the picker-fingers on one arm are driven from a single pulley—as, for instance, 32 on a shaft 33, journaled in bearings 34, carried by the vertical slat 2. This pulley rotates in a horizontal plane and around it an endless belt 35 passes, the said belt being the means common to all the picker-fingers of the picker-arm for driving the picker-spindles carried thereby. In order to utilize this belt for driving all the spindles, I provide on the first spindle a conical roller 36, which gives the necessary twist or change in position of the belt for driving all of the spindles whose axes are parallel with that of this conical roller 36. By this conical roller the driving-surface of the belt is turned through an angle of forty-five degrees, and after leaving this conical roller or pulley the belt passes over and under alternately-cylindrical rollers or pulleys 37, each of which is on one of the picker-spindles to drive the same. From the last cylindrical roller 37 the belt passes under a conical roller or pulley 38, thence around a cylindrical pulley 39, whose shaft 40 is inclined in respect to the picker-spindle of the series just mentioned and also inclined to the spindle of the series marked 41′, which, as before stated, are at right angles to the series first mentioned and which are marked 31 in Fig. 11. From the pulley 39 the belt passes under a conical pulley 42 of one of the spindles 41′ and thence over and under, respectively, the cylindrical pulleys 42′ 42″, each arranged on a picker-spindle, and thence over a conical pulley 43, from whence the belt repeats its circuit around the horizontally-disposed driving-pulley 32. From this it will be seen that all of the spindles are driven from a common driving connection extending longitudinally of the picker-arm, the said connection in this form of my invention comprising a belt which is directed so as to drive the spindles disposed at right angles to each other. Each shaft 33 is driven by a gear 44 at its upper end, meshing with a rack 45, formed on a frame 46, which is constructed in two parts 47 48, Fig. 7, bolted together at 49 and embracing the sprocket-shafts 5 and one of the vertical frame-posts 11. The rack extends almost the length of the side of the frame 46 which is nearest the space 9, which receives the cotton-plant, so that as the slatted carrier moving in the direction of the arrow, Fig. 1, brings the picker-arms to a position at right angles to the line of draft of the machine the gear-wheel 44 on each vertical shaft 33 will mesh with the rack 45 and all of the picker-spindles of that arm will be rotated, so that the picker-fingers 25 will be revolved and upon contact with the cotton will seize the same and pick it from the plant. This rotary movement of the pickers will continue until the gear-wheel 44 has passed around the curved portion 45′ of the rack and has reached the point 45″. At this point a locking-cam 50, having a concave face, is brought into engagement with a locking-track 51, having a convex face, which will hold the gear-wheel 44 from rotation, and consequently all of the picker-fingers will remain at rest. This condition of the parts will continue until the locking-cam 50 slides off from the track 51, at which moment the gear-wheel 44 will mesh at its outer periphery with a rack 52, carried by the frame 48. This will cause the picker-spindles and the fingers carried thereby to be rotated in a direction the reverse of that which has been just described for picking the cotton from the plant, and this reverse rotation serves to untwist the cotton, so that it may be readily removed from the picker-fingers. It will be understood that in the picking-off action the rapid rotary movement of the picker-fingers upon engaging the cotton gives a twisting action thereto, and the action of the rack 52 and the reverse rotation of the picker-fingers serve to untwist the fingers from the cotton, which may now be readily removed or cleared therefrom. As the picker-arms are making the turn at the rear end of the slatted carrier and during the time the picker-spindles are locked against rotation the arms enter the spaces 53 between partitions 54, extending horizontally and forwardly from the rear end of the frame, where they are connected with an upright board 55, secured to the frame.

Each horizontal row of picker-arms has its own space or channel 53 in which to move and be separated from the adjacent upper or lower row of picker-arms by the intermediate partition 54, and any cotton which may fall from the arms in the space 53 will be caught by the partitions 54 and will be swept forward by the onward movement of the picker-arms to a belt 56, passing around rollers 57, journaled in side frames 58 58', bolted at 59 to the main frame, the said side frame 58' being connected with and supported from the side frame 58 by bars 60. The main purpose of the belts 56 is to clear the picker-fingers of the cotton which has been practically released by a reverse movement of the fingers, but which may still be hanging thereon. For this purpose each belt is provided with clearer-points 61, extending across the belt in rows and projecting from a metal strip or base-plate 62, secured to the said belt. These belts are so arranged that the picker-arms must pass through the spaces 63 between them, and from this it results that the fingers on each arm are cleared by the clearing-points of the adjacent belt. These points are curved at their ends in the direction of movement of the belts, and they taper at their extreme ends. Referring to Fig. 5, it will be seen that the belt, there shown moving in the direction of the arrow, will with its lower side clear the cotton from the picker-fingers of the picker-arm indicated in the position at $x$, while the clearing-points on the upper side of said belt will act to clear the cotton from the downwardly-directed picker-fingers of the picker-arm in the position indicated at $y$. It will be seen that the lower portion of the belt moves in the opposite direction from that of the under picker-arm $x$, while the upper portion of the belt moves in the same direction with the upper picker-arm $y$. The cotton will be readily picked off from the fingers of the arm $x$ and will be carried up and forwardly by the said belt. The belt moves at a greater rate of speed than the rate of travel of the picker-arm, and consequently the upper portion of the belt will clear the cotton from the picker-arm at $y$ notwithstanding the fact that this portion of the belt and the picker-arm are moving in the same direction. At 65 I show clearer-plates which extend across from the side frame 58 to the side frame 58', from which side frames the said clearer-plates are supported by brackets 65', adjustably held by bolts 66. These plates are so arranged, as shown in Fig. 5, that they lie intermediate of the path traveled by the picker-arms and the belt, so that the picker-fingers and also the picker-points will move close to the upper and lower surfaces of the clearer-plate. The effect of this clearer-plate is to insure the complete clearing of the cotton from the picker-fingers. The clearer-points having engaged the cotton will draw it under the clearer-plate, and this entirely separates it from the picker-fingers. The side frame 58' is provided with slots or openings 67 for the passage of the picker-arms. All of the clearer-belts are driven in the same direction by a sprocket-chain 68, passing around sprocket-wheels 69 on the belt-rollers and around idlers 70, suitably journaled in the frame. The sprocket-chain 68 is driven from a sprocket-wheel 71 on a shaft 72, journaled in bearings 73, and driven through a sprocket 74, chain 75, and sprocket-wheel 76 on the shaft 14, before described. The clearer-belts 56 discharge the cotton at their front ends upon an elevating-belt 78, which has points thereon to engage the cotton and raise it to be discharged into any suitable receptacle. The belt 78 passes over a drum 79 on the shaft 72 and over an idler-drum 80 on a shaft 81, journaled in bearings 82 at the lower part of the frame. In my present machine I have improved the action of the picker-finger by giving to each point a sharp bend or screw-twist in the direction in which the fingers rotate, Fig. 14, to pick off the cotton. This feature will be clear from Fig. 14, in which it will be noticed that the middle finger of the series instead of continuing in the axial plane of the spindle bends toward the right. This enables the picker-fingers to more firmly grasp the cotton and insures the removal of the cotton from the plant however slight the contact of the picker-fingers therewith may be, and upon the reversal of the movement the fingers tend to unscrew themselves from the cotton.

Instead of using a belt as the common driving means for the plurality of series of picker-fingers arranged in different angular positions relative to each other I may also use gearing, as shown in Figs. 12 and 13. The common driving connection extending longitudinally of the picker-arm in this instance consists of a rotary shaft 84, journaled in the end castings 85 86 of the arm and driven through beveled gearing 87 from the vertical shaft 33', carried by the slat 2. This shaft has a series of beveled gears 88 thereon, and each of these meshes with beveled gears 89 on the picker-spindle 31. These spindles do not extend entirely across the picker-arm, as in the form first described; but nevertheless they are arranged at different angles around the circumference of the picker-arm. At their inner ends they are journaled in brackets 90, secured to the inner side of the picker-arm. Substantially the same result is accomplished in this form of driving means for the picker-fingers as in the form first described, in that the said fingers may be arranged in different angular positions around the axial line of the picker-arm. The picker-fingers, as shown in Figs. 11 and 13, project at an inclination to a vertical plane and are thus arranged to secure the maximum effect. It will be noticed that they diverge from each other, and they not only project forwardly and rearwardly of the sides of the picker-arm, but they project above and below the said arm, and thus each is in position to have an effective engaging action on the cotton whether the contact therewith be against the side of the boll or against the upper or lower portion thereof. In other words, the picker-finger by the arrangement shown is located in the best position for effective work.

Instead of bevel-gearing, as shown in Figs. 12 and 13, the drive means may consist of friction-gearing. When the belt is used for driving the spindles, the said spindles may be loosely arranged in their bearings, as in my former patent, so as to prevent the cotton from clogging between the spindle and the bearing-surface; but where gearing is employed as above described the spindles are made to fit closely the cone projections, as at 91, Fig. 14, and the spindles are reduced or tapered at 92, so that a space occurs at 93, and this, in connection with the inner bevel at 94 at the outer end of the cone or nipple, prevents the cotton from binding and choking the spindle.

It will be seen from Fig. 1 that each link of the chain 3 has attached thereto one of the vertical slats, so that the said slatted carrier for the picker-arms serves as an inclosure for the driving connections for the picker arms and fingers, thus keeping these parts free from lint or other material which would tend to interfere with the proper operation of these parts. By the use of the slatted carrier it will be seen from Fig. 1 that a plurality of picker-arms may at all times be extending at right angles across the trough or channel 9 to engage the cotton.

The tapered form of spindle above described is of advantage also when the belt form of driving connection is used, as in any case this form will prevent choking of the cotton in the cone-nipple.

The clearer-points on the belts are of special construction in order that they will discharge the cotton carried thereby. For this purpose they are tapered at their extreme ends, and as the belts make the turn around the forward rollers the cotton will be thrown from the tapered curved ends of the clearer-points by the centrifugal force. The bend or curve in the clearer-points is to enable the points to firmly engage the cotton as said points are moving horizontally. The points are securely fixed to the cross-bars, so that they will always stand in proper relation with their curved ends pointing in the direction of movement. The edges of the belts run in guideways 2, Fig. 5ª, which prevents them from sagging down.

It will be noticed that the cones for the picker-spindles have their bases on the surface of the picker-arms and their sides incline or taper throughout the extent of the projections. This prevents the projections from catching in the limbs or branches of the plants.

I claim as my invention—

1. In combination with a picker-arm, a plurality of picker-spindles angularly arranged in respect to each other, a driving-belt and cone-pulleys over which the belt passes, said pulleys being located on the picker-spindles, and said belt extending longitudinally within the arm substantially as described.

2. In combination, in a cotton-picking machine, a picker-spindle, means for rotating the same and picker-fingers on the end of said spindle comprising a plurality of divergent points whose general direction is longitudinally of the spindle said points being bent intermediate of their length in the direction of rotation of the fingers, substantially as described.

3. In combination with a plurality of picker-arms, a vertically-arranged slat for supporting the same, a shaft extending vertically, bearings supported on the vertical slat for said shaft, chains to which the said slat is connected at its upper and lower ends, means for driving the chains horizontally, a gear-wheel on the vertical shaft and a stationary rack for rotating the gear engaging therewith directly, picker-spindles carried by the picker-arms and driving connections to said spindles from the vertical shaft extending through the slat and within the picker-arms, substantially as described.

4. In combination, rotary picker means for engaging the cotton, carrier means therefor, a stationary rack, a gear to engage the said rack, connections between the said gear and the rotary picker means for turning the same in one direction and a second rack for reversing the movement of the said gear and picker means and means intermediate of the racks for locking the gear and the rotary picker means against movement, substantially as described.

5. In combination, picker-arms, carrier means therefor, rotary picker-spindles carried by the said arms, means for rotating the said picker-spindles in one direction and for reversing the said direction and means for locking the picker-spindles against movement at intervals, substantially as described.

6. In combination with picker-arms, carrier means therefor and traveling belts having clearer-points thereon to take the cotton from the picker-arms, and clearer means between the belts and arms substantially as described.

7. In combination with the picker-arms, clearer-belts having clearer-points thereon and operating between the picker-arms and a fixed clearer-plate arranged adjacent to the path of the clearer-belt and picker-arm, substantially as described.

8. In combination with picker-arms, a carrier therefor, a series of partitions 54 between which the picker-arms move after leaving the plant and clearer-belts forming substantially continuations of the said partitions and having points to take the cotton from the picker-arms, substantially as described.

9. In combination with a picker-arm, a picker-spindle, a cone through which the picker-spindle extends, the said picker-spindle being tapered with a recess between the tapered part and the cone and the end of the recess being enlarged, both the enlargement at the end of the cone and in a portion of the recess adjacent the tapered part of the spindle being tapered substantially as described.

10. In combination, picker means comprising a picker-arm having picker-fingers and clearer means comprising a moving clearer device and a fixed clearer-plate coöperating with the picker means and the moving clearer means, said picker means moving in a longitudinal plane parallel with line of movement of the clearer device, substantially as described.

In testimony whereof I affix my signature in presence of two witnesses.

PETER PAUL HARING.

Witnesses:
HENRY E. COOPER,
C. S. MIDDLETON.